(No Model.)

H. HOWE.
Lubricator.

No. 237,534. Patented Feb. 8, 1881.

Witnesses:
Fred G. Dieterich
Jno. H. Madigan

Inventor:
Hezekiah Howe,
by Louis Bagger & Co.
his Attorneys.

UNITED STATES PATENT OFFICE.

HEZEKIAH HOWE, OF WELLSVILLE, NEW YORK.

LUBRICATOR.

SPECIFICATION forming part of Letters Patent No. 237,534, dated February 8, 1881.

Application filed November 18, 1880. (No model.)

*To all whom it may concern:*

Be it known that I, HEZEKIAH HOWE, of Wellsville, in the county of Allegany and State of New York, have invented certain new and useful Improvements in Lubricators; and I do hereby declare that the following is a full, clear, and exact description of the invention, which will enable others skilled in the art to which it appertains to make and use the same, reference being had to the accompanying drawings, which form a part of this specification, and in which—

Figure 1:
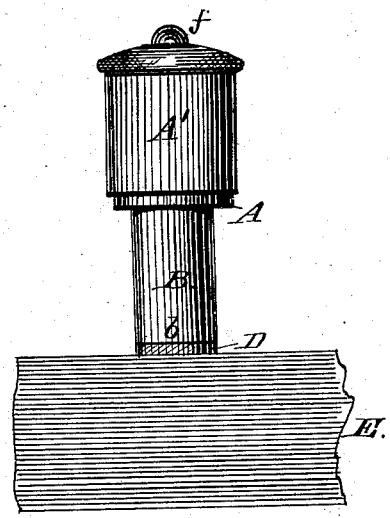
Figure 2:
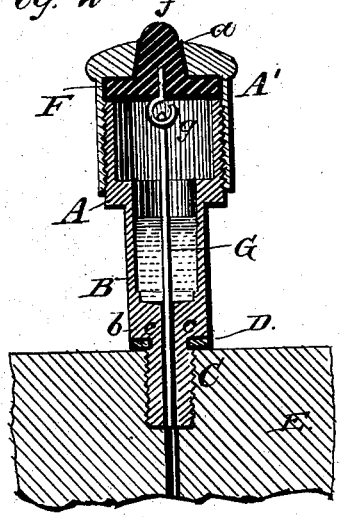

Figure 1 is a side elevation, and Fig. 2 is a vertical section.

Similar letters of reference indicate corresponding parts in both the figures.

My invention relates to devices for lubricating vehicle-axles, and has for its object to construct a lubricator which may be readily attached to and again detached from the axle when desired, which may be manufactured at a small expense, and will economize in the use of the lubricating material.

In the accompanying drawings, A represents the oil-cup, which is made with a downwardly-extending tube, B, the lower end of which is narrowed to form a screw-threaded sleeve, C, the upper part of which sleeve has an annular groove, c, to receive the washer D, which bears against the shoulder b of tube B. The threaded sleeve C is screwed into the box E, the washer pressing against the box, so as to prevent the oil from working up outside of the threaded sleeve and out upon the box. The oil-cup A is also threaded on its outside to receive the screw-threaded cap A', the top or cover of which has a central aperture, a, into which projects a button, f, made in one piece with a disk, F, of rubber or other elastic material, which is inserted into the top of the cap and provided with a wire hook or eye, g, in its under side, to which is attached, removably, the wire plunger G, which extends down into tube B and its continuation or threaded sleeve C.

In using this device, remove the cap A', with its elastic disk and plunger, fill cup A with oil, insert the plunger, and screw on the cap. The plunger will stir the oil, so as to keep it, in cold weather, in proper fluid condition and conduct it into the axle-box; but in warm weather the plunger may be removed and the oil forced down through sleeve C into the box simply by pressing on the projecting button f of the elastic disk F.

This device may be applied, with little trouble, to axle-boxes and vehicles of any kind. It will supply the lubricant regularly and evenly, and will effectually prevent gumming. The axle may be freshly oiled, whenever desired, without removing the axle-box, and there is no leakage of oil, whether the vehicle is in use or not.

Having thus described my invention, I claim and desire to secure by Letters Patent of the United States—

The lubricating device composed of the oil-cup A, having tube B and threaded sleeve C, provided with groove c and washer D, cap A', having central aperture, a, elastic disk F, having button f and hook g, and detachable plunger G, the whole constructed and combined substantially as and for the purpose herein shown and specified.

In testimony that I claim the foregoing as my own I have hereto affixed my signature in presence of two witnesses.

HEZEKIAH HOWE.

Witnesses:
 JOSEPH T. POWER,
 JAMES H. MANDEVILLE.